April 19, 1960
G. I. ROBINSON ET AL
2,933,143
ARTICULATED VEHICLE
Filed June 27, 1957
3 Sheets-Sheet 1
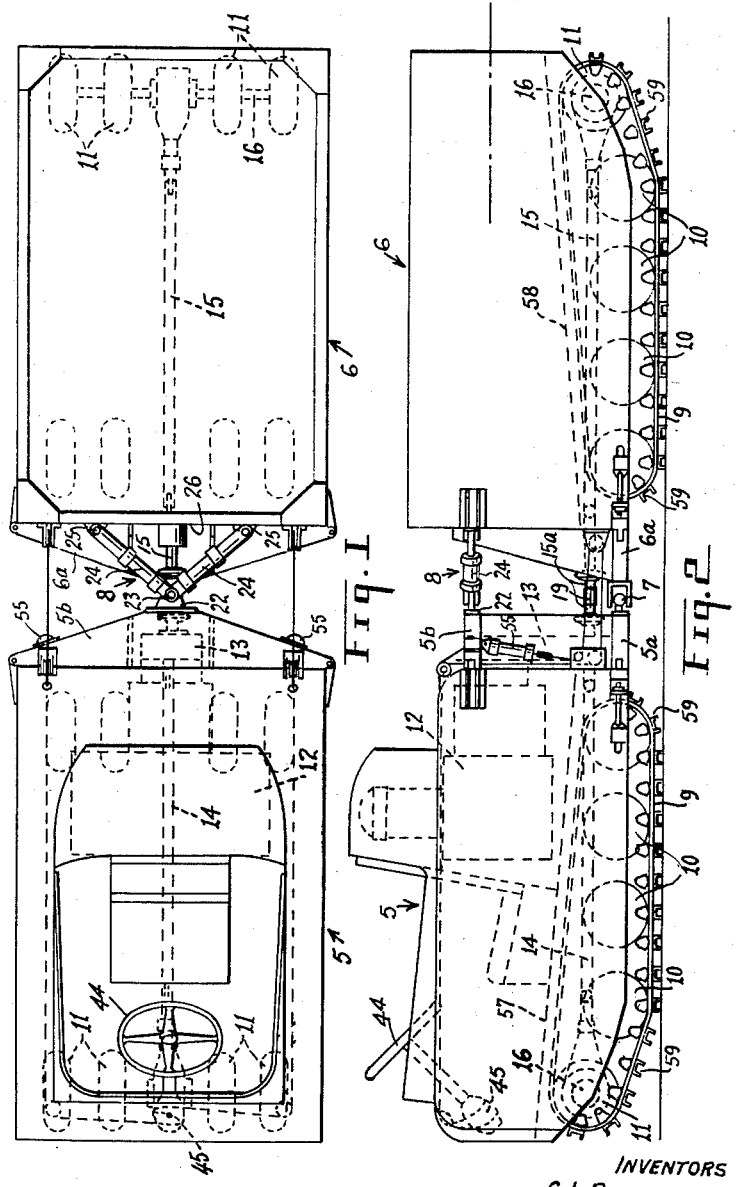
INVENTORS
G.I. ROBINSON
L.J. STYPINSKI
BY Fetherstonhaugh & Co.
ATTORNEYS April 19, 1960
G. I. ROBINSON ET AL
2,933,143
ARTICULATED VEHICLE
Filed June 27, 1957
3 Sheets-Sheet 2
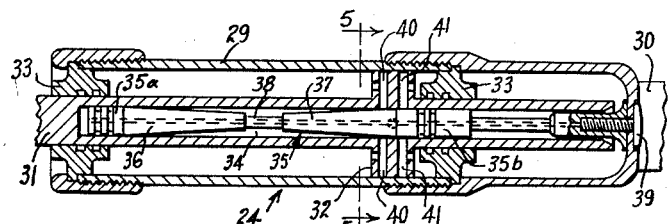
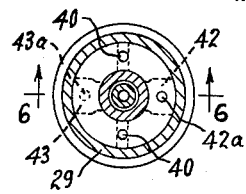
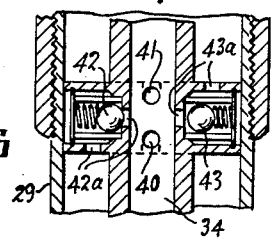
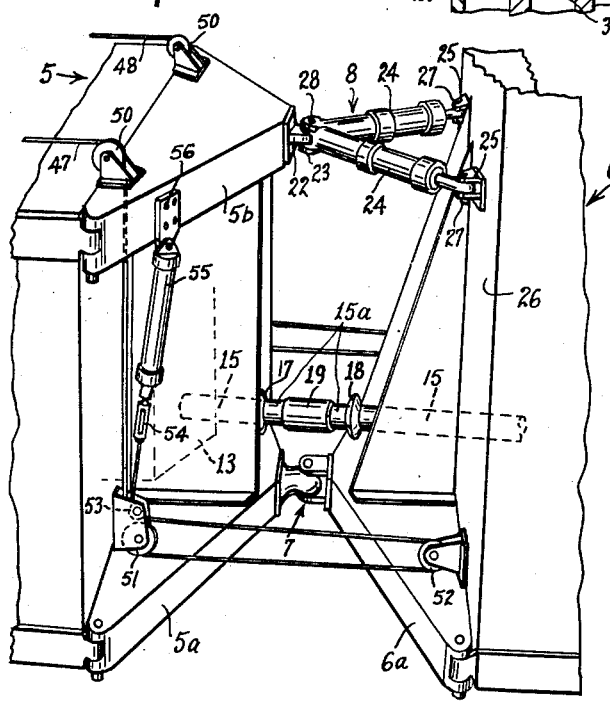
INVENTORS
G.I. ROBINSON
L.J. STYPINSKI
BY Fetherstonhaugh & Co.
ATTORNEYS

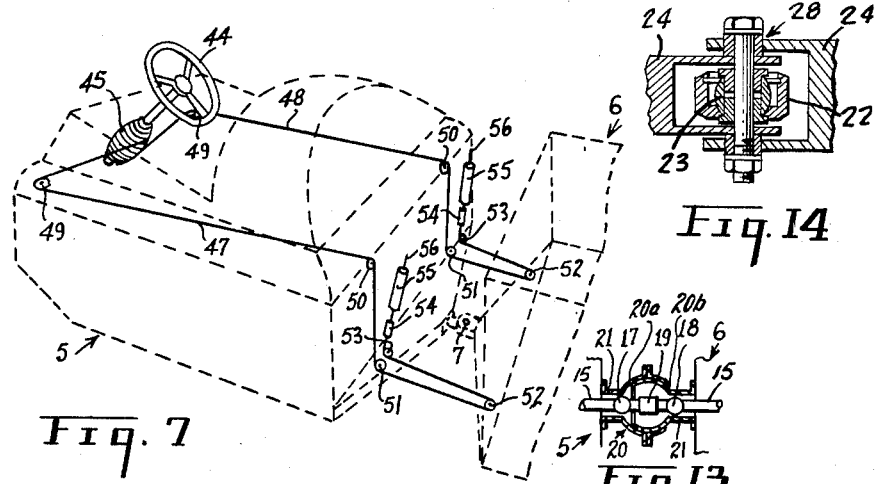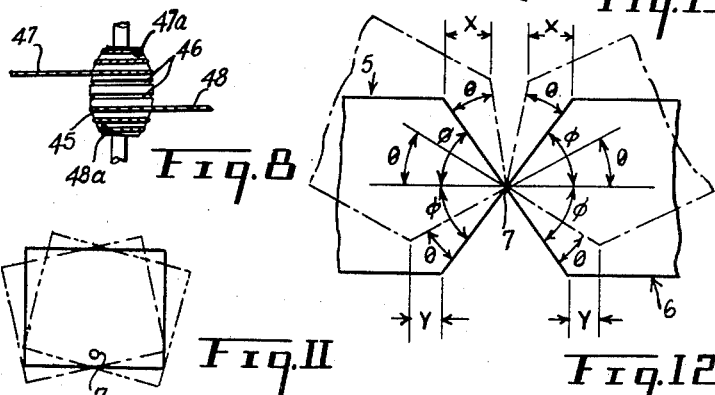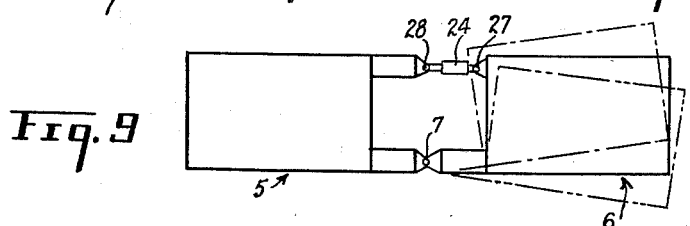

United States Patent Office 2,933,143
Patented Apr. 19, 1960

2,933,143

ARTICULATED VEHICLE

George Ingram Robinson, St. Eustache-sur-Le Lac, Quebec, and Leszek Jozef Stypinski, Rosemere, Quebec, Canada, assignors to Canadair Limited, Montreal, Quebec, Canada Application June 27, 1957, Serial No. 668,554

13 Claims. (Cl. 180—14)

This invention relates to articulated vehicles for use on land, water, snow or on soft ground such as bogs or sand, and more particularly to vehicles having two or more sections articulated together in such a manner that the various sections have a wide range of pitch and roll relative to each other, the limits of the pitch and roll being controlled by shock absorbing members, and having a flexible steering system giving complete control of the articulated vehicle in any degree of pitch and roll of the sections.

The invention consists essentially of vehicle sections which may or may not have a common universal, articulated drive shaft linking the sections, the sections being joined together by a ball joint member allowing complete freedom of movement in any direction of one section of the vehicle relative to the other section, and by a system of shock absorbers mounted between the sections in such a manner that a restricted and controlled range of freedom in pitch and roll is provided between the sections. The steering control mechanism is by means of flexible cables laid over a tapered pulley and passing over pulleys from one section to the other and terminating in spring anchors, the geometry of the steering system being such that cable must be payed out at a greater or lesser rate than is taken in due to the pitch and roll of one section of the vehicle relative to the other. It is often necessary in any articulated vehicle to connect individual units together by means of a spherical or similar joint so that the joint provides freedom of angular movements of units relative to one another in pitch and roll as well as in steering or cornering. Freedom of pitch and roll enables the vehicle to travel over uneven ground with, as far as possible, uniformity of ground contact pressure on all units. This results in a minimum fluctuation of stresses in the framework due to ground "bridging" effects. It also ensures that a maximum tractive effort is developed on all powered units of the vehicle. However, when extremely rough terrain is encountered, it is desirable to place a limit on freedom in pitch and roll. A large crevice, for instance, may cause "jack-knifing" of the vehicle in the vertical plane if unrestricted freedom in pitch occurs. Similarly a deep pot hole to one side of the vehicle on a slope may cause overturning of a unit if complete freedom in roll is provided. Some limit to freedom in pitch and roll is, therefore, desirable so that the vehicle can span the larger crevices and holes and effectively become a single unit in these instances.

The object of the invention is to provide a vehicle which comprises two or more articulated sections or units which can be operated over uneven ground with, as far as possible, uniformity of ground contact pressure on all units.

A further object of the invention is to provide an articulated vehicle in which a system of shock absorbers between the units of the articulated vehicle, limit the range of pitch and roll movement of one unit with respect to the other.

A further object of the invention is to provide a system of shock absorbers between the units of the articulated vehicle which serve as structural load carrying members under all conditions of pitch and roll.

A further object of the invention is to provide a steering system for articulated vehicles in which the steering mechanism has a differential action in the taking up and paying out of the steering cables.

A further object of the invention is to provide a steering system for an articulated vehicle which will accommodate itself to all positions of the units of the vehicle relative to each other under all conditions of pitch and roll.

A further object of the invention is to provide a drive system which can be applied to the individual units of an articulated vehicle to provide driving power with a minimum of stress or strain under all conditions of steering, pitch and roll of the vehicle.

A further object of the invention is to provide a drive system which can be applied to the individual units of an articulated vehicle to provide drive power with no differential velocities of drive shaft for the individual units under all conditions of steering, pitch and roll.

A further object is to provide an articulated vehicle capable of movement over water and be able to climb river banks without undue strain on the articulation connections when the vehicle is partly in the water and partly on the ground.

These and other objects will be apparent from the following detailed specification and the accompanying drawings in which:

Figure 1 is a plan view of a two unit articulated vehicle of the type hereinafter described.

Figure 2 is a side elevation of the articulated vehicle.

Figure 3 is an enlarged perspective view of adjacent portions of the units making up the articulated vehicle and showing the articulated joint connections, the drive and the lay of the steering cables between the units.

Figure 4 is a longitudinal cross sectional view of one of the shock absorbing members forming part of the connections between units of the articulated vehicle.

Figure 5 is a vertical cross section on the line 5—5 of Figure 4.

Figure 6 is an enlarged sectional view of the piston head of the shock absorber taken on the line 6—6 of Figure 5 and showing the fluid control valves.

Figure 7 is a perspective schematic view of the steering mechanism in full lines enclosed within the dotted outlines of the vehicle units.

Figure 8 is an enlarged detail view of drum over which the steering cables are laid and used for taking up and paying out the cable.

Figure 9 is a diagrammatic side elevation of the articulated vehicle showing the manner in which is provided a limited degree of freedom in pitch between the two units of the articulated vehicle.

Figure 10 is a diagrammatic plan view of the articulated vehicle showing the side displacement of one unit relative to the other due to relative degree of freedom in roll permitted between the two units.

Figure 11 is a diagrammatic end elevation of the articulated vehicle indicating the relative degree of freedom in roll permitted between the two units.

Figure 12 is a diagrammatic plan view giving details of the steering geometry around the vehicle articulated joint.

Figure 13 is an enlarged sectional view, partly diagrammatic, of an alternative form of articulated joint between the units of the articulated vehicle.

Figure 14 is a detailed sectional view of one of the shock absorber ball joints.

Referring to the drawings, Figures 1 and 2 disclose a preferred form of the articulated vehicle in which one unit is the power unit and the other unit is the carrier unit, with a drive shaft connecting the power plant with the driving wheels of the treads of each unit of the vehicle. It is to be understood that the vehicle units could take any other form suitable for the particular type of work for which the vehicle is intended. For instance, the power unit may not be so limited but could well be a combined power unit and carrier unit; the carrier unit could be designed to carry both goods and passengers and could be of open or enclosed type as desired. Furthermore, while the drive is shown as being applied to both units of the vehicle, it is to be understood that the drive could be applied to one unit only, or individual drives could be applied to each unit of the vehicle.

The articulated vehicle hereinafter described and illustrated in the drawings comprises a drive unit 5 and a carrier unit 6 connected together by means of a ball joint 7, a system of shock absorbers 8, and a steering system which will accommodate itself to the relative movement of one unit to the other under all conditions of travel.

The drive unit 5 and carrier unit 6 are mounted on a system of treads 9 supported on the guide wheels 10 and driven by the drive wheels 11. A power plant 12 transmits power through the gear case 13 to the drive shafts 14 and 15 connected to the axles 16 and drive wheels 11 of both units. The portion 15A of the drive shaft 15 which bridges the gap between the units 5 and 6 is provided with a pair of universal joints 17 and 18 spaced apart an equal distance from the point of articulation of the two units 5 and 6, i.e., an equal distance from the ball joint 7, thus ensuring equal angular displacement of both universal joints 17 and 18 at all angles of articulation. In this way the differential angular velocities produced by each rotating universal joint 17 and 18 during articulation are cancelled and the shaft rotates smoothly with no oscillation. An expansion joint 19, which may be of the spline type, between the two universal joints 17 and 18 allows for linear displacement between the universal joints during articulation. An alternative form of ball joint and shaft assembly is shown diagrammatically in Figure 13 in which articulation is provided by a spherical joint 20 with the drive shaft 15 passing through the centre of the spherical joint. The universal joints 17 and 18 are here shown as being located within the sleeves 21 connecting each half 20a and 20b of the spherical joint 20 with each unit 5 and 6 of the vehicle.

The adjacent ends of the units 5 and 6 on the horizontal plane of the ball joint 7 are angled back from each other to form tapered brackets 5a and 6a, to allow one unit to take up an angular direction relative to the other about the ball joint 7. The unit 5 is provided near its top level with a tapered bracket 5b similar to the lower tapered bracket 5a and has secured to it a bracket 22 carrying a ball joint 23 located in a vertical centre line directly above the centre line of the ball joint 7. The system of shock absorbers 8 comprise a pair of hydraulic jacks 24 pivotally anchored at one end to the bracket 22 and at their other are pivotally anchored to the spaced apart brackets 25 mounted on the vertical end wall 26 of the unit 6. These shock absorbers 24 are therefore arranged in a horizontal V formation and attached to the unit 6 at their base by the ball joints 27 and at their apex to the unit 5 by ball joint 28. The ball joint 28 is vertically above ball joint 7 so that complete freedom of articulation occurs in a horizontal plane. This permits unrestricted steering and cornering of the vehicle. Referring to the diagrammatic Figures 9, 10 and 11, in Figure 9 it will be seen that a limited freedom of pitch occurs between the front and rear units 5 and 6 as provided by simultaneous extension and compression of the two shock absorbers. Similarly in Figures 10 and 11 it will be seen that a limited freedom of roll occurs between the front and rear units 5 and 6, in this instance, as provided by a differential extension and compression of the shock absorbers 24. As drawn, the base of the V arrangement moves sideways permitting the rear unit 6 a restricted rotation about the ball joint 7. Quantitative values of the limits of freedom in both pitch and roll are set by the angles of the V of the shock absorbers 24, and the amount by which the shock absorbers 24 extend and compress. Control of roll and pitch within the limits is obtained from the shock absorber characteristics.

Referring now to Figures 4, 5 and 6, each shock absorber 24 comprises a cylinder 29 having an arm extension 30 forming the pivotal anchor on the bracket 22 of the unit 5 and a piston rod 31, carrying the piston head 32, pivotally anchored to the bracket 25 on the unit 6 as shown in Figure 3. The cylinder 29 is sealed off by the end blocks 33 which are centrally bored to form guides for the piston rod 31. The piston rod 31 is bored from its inner end to provide a cylinder 34 to receive the control needle 35. This control needle 35 takes the form of a double piston 35a and 35b with the section between these pistons being tapered down at 36 and 37 to a mid cylindrical section 38. The control needle 35 is held against displacement by the end screw 39 mounted in the end of the cylinder 29. The piston head 32 is provided with a pair of transverse ports 40 and 41 both of which are open to the cylinder 34 while the port 40 is open to the cylinder 29 on one side of the piston 32 while the port 41 is open to the cylinder 29 on the other side of the piston. A pair of check valves 42 and 43 are located within the piston 32 in a position at right angles to the ports 40 and 41. The check valve 42 controls the flow of fluid from one end of the cylinder 29 to the cylinder 34 through the ports 42a, while the check valve 43 controls the flow of fluid from the other end of the cylinder 29 to the cylinder 34 through the ports 43a. As shown in Figure 4, the piston 32 is at the inner end of its stroke and the piston portion 35b of the control needle 35 seals the transverse ports 41. In this position of the piston 32 a small volume of fluid is trapped between the piston 32 and the adjacent end block 33 to form a positive but elastic stop against further inward movement of the piston 32 and piston rod 31.

Initially a small quantity of fluid flows from the left side of the piston 32 through the ports 40 into the cylinder 34 and thence through the check valve 43 to the right hand side of the piston 32. Port 41 in this condition is sealed off by the piston portion 35b of the control needle 35. Therefore, fluid cannot initially flow through the port 41 to the right hand side of the piston 32. The resulting restriction in fluid flow causes a large reaction to shock absorber motion at this point. However, once the piston 32 is displaced slightly to the left, port 41 will be moved over the tapered portion 37 of the needle and a flow of fluid then occurs from left to right of the piston through the port 41, reducing reaction to shock absorber motion. As will be noted from Figure 4 of the drawings the principal restriction to flow at this point of shock absorber travel is the cross section area of the annular chamber of the cylinder 34 around the control needle 35. Further motion however, causes an expansion of this cross section area as the piston 32 moves further to the left on the tapered control needle 35. Progressively more oil flows from left to right of the piston 32 causing less reaction to piston motion so that no significant resistance to motion of the piston occurs for the centre portion of the travel. Further movement of the piston 32 to the left will cause a reversal of the conditions and characteristics so far described, until the piston 32 is finally arrested by a trapped volume of fluid at the left hand end of the cylinder 29 between the piston 32 and the left hand end block 33.

The shock absorber above described, is connected on the articulated vehicle such, that on level ground, the piston 32 will be at the centre of its travel in the cylinder 29. This permits movement of the piston 32 in either direction and hence up and down relative pitch of the vehicle as well as roll in both directions. Motion from the neutral or mid position of the piston 32 will result in a minimum of initial resistance with a rapid build up to a high value of final resistance as the limits of travel are reached. Minimum initial resistance gives smooth relative motions of the units 5 and 6 of the vehicle when travelling over slightly bumpy surfaces, high final resistance results in a maximum of shock absorption capacity together with the avoidance of sudden interval impact conditions as the limits of travel are reached. It will be noted that the characteristics of the shock absorbers are such that resistance to motion at any point of piston travel will be a direct function of the speed of motion. This is because the speed of motion governs the speed at which fluid must be transferred from one side of the piston 32 to the other side through the ports 40 and 41. Shock absorption characteristics of the vehicle will therefore, at all times match the magnitude of impact loads encountered by the vehicle.

The description so far given relates to the shock absorbers as drawn, which gives the most desirable characteristics for general operation of the vehicle. However, other characteristics may be required in special circumstances. For example, referring to Figure 9, it may be found desirable to restrict upward pitch or sagging compared to downward pitch or hogging. This would further facilitate the crossing of crevices. In such a case the neutral condition of the shock absorbers would be positioned to the left or right of the midlength of travel to give the required motions, over all length of the shock absorbers being adjusted to suit. Other detailed characteristics may be modified merely by variations in the shape of the control needle 35 by lengthening or shortening the tapered portions or by making one tapered portion different from the other.

The relative movements of the units 5 and 6 impose conditions requiring a steering or control system where the geometry is such that cable must be payed out at a greater or lesser rate than it is taken in.

As shown in Figures 1, 3 and 7 steering is accomplished by means of the steering wheel 44 rotating the double tapered pulley 45. The surface of this pulley 45 is cut with a spiral groove 46 extending over both tapered ends.

Two cables 47 and 48 have their ends secured to the extremities of the pulley 45 at 47a and 48a, and are wrapped around the pulley for a few turns before being led off over the guide pulleys 49, located at the side of the unit 5. The cables 47 and 48 are then lead rearwardly and over the guide pulleys 50 and thence downwardly around the guide pulleys 51 which are located immediately above the bracket 5a of the unit 5. The cables then bridge the gap between the units 5 and 6 and are led around the pulleys 52 located immediately above the bracket 6a of the unit 6. The cables 47 and 48 then double back over the gap between the units and are led about the pllleys 53 and are secured to the turnbuckles or rigging screws 54 which in turn are fastened to the spring dash pots 55 anchored to the upper tapered bracket 5b at 56.

Operation of the system is as follows: Turning of the steering wheel 44 causes rotation of the spiral drum 45 and hence the taking up and paying out of cables 46 and 47. This causes a cramping action to occur between the front and rear units 5 and 6 of the vehicle about the ball joint 7, the corners of the two units being pulled together on the side on which cable is taken up on the drum 45. An analysis of the steering geometry of the steering system shows that a differential action must occur between the rate of take up of cable and the rate of payout of cable if slackness of the cable is to be avoided. This is demonstrated in Figure 12 which shows that for any cramped condition of the front and rear units denoted by angle $\theta$ the distance 2X by which approaching corners come together will always be greater than the distance 2Y by which diverging corners move apart. Hence a differential action must always occur in the taking up and paying out of cable such that the rate of take up of cable is always greater than the rate of payout of cable, the relation between the two being a specific function of the geometry of articulation if slackness is to be avoided. The differential action is fully provided for by the spiral drum 45. Referring to Figure 8 it will be seen that by virtue of the double tapered spiral groove 46 on the drum 45 and the particular lay of the cables in the spiral groove 46, cable is always taken up from the neutral steering wheel position at a faster rate than it is payed out. In actual fact, the shape of the drum and diameter of grooves is such that, at all times, cable is taken up and payed out at sufficiently accurate differential rates to avoid significant slackening or tightening of the cable at any steering angle for the given steering geometry.

It has been stated that pulleys 51, 52 and 53 are, as far as possible, located in a plane which contains joint 16. This ensures that a minimum of tensioning or slackening of the cables occurs from causes other than steering as, for example, relative pitching or rolling of the two units 5 and 6 about the ball joint 7.

However, rigging screws 54 and spring dashpots 55 are primarily included in the steering system to take care of any residual effects arising from the practical positioning of pulleys 51, 52 and 53 coupled with pitching and rolling considerations. The rigging screws 54 are used to pre-tension the cables 47 and 48 and stretch the spring pots 55 to a mean compressed position so that any slackening or tightening of the wires with pitching and rolling is taken care of by movements in the spring pot. The spring pots 55 also serve to maintain a relatively constant tension on the cables 47 and 48 to prevent them from jumping pulleys and guides and thus becoming jammed. A secondary purpose of the rigging screw 54 is to provide a quick disconnect point for the steering system to enable easy detachment of the rear unit 6 which would otherwise be fastened to the front unit 5 by the steering cables.

Each unit 5 and 6 of the articulated vehicle is so constructed that the floors 57 and 58 respectively are made watertight with the side walls of the unit so that each unit can be floated in water. The treads 9 of the units are fashioned with transverse channels 59 which act as paddles to propel the vehicle through the water. When the vehicle is being transferred to or from land to water the action of the shock absorber system 8 and the steering mechanism is exactly the same as when the vehicle is travelling over uneven ground. In travelling over rough ground, bog, sand, snow or in water the rear unit 6 of the vehicle acts as a rudder under positive control of the steering mechanism.

From the above description it will be seen than an articulated vehicle of rugged construction has been provided which will be adaptable to operation under the most difficult of conditions; which can have a maximum of pitch and roll under positive control and without loss of steering control even in the extreme displacement of one unit with the other.

What we claim is:

1. An articulated vehicle comprising two or more units joined together by a universal joint and a steering system including a system of shock absorbers, said shock absorbers being pivoted to adjacent ends of the vehicle units, said shock absorber system comprising a pair of shock absorbers pivoted together at one end to one unit of the vehicle in a position vertically above said universal joint and spaced apart on either side of the longitudinal centre line of the vehicle at their other end, the said system of shock absorbers permitting a controlled amount of pitch and roll of the units of the vehicle relative to each other about said universal joint, and the said steering system for said vehicle flexibly bridging the gap between the units of the vehicle and being located on either side of and approximately in the same horizontal plane of said universal joint, the said steering system having a differential action in take-up and pay-out commensurate with the cramping action between the units of the vehicle on angular displacement of one unit with respect to the other unit of the vehicle.

2. An articulated vehicle comprising two or more units joined together by a universal joint and a steering system including a system of shock absorbers, said shock absorbers being pivoted to adjacent ends of the vehicle units, the said shock absorber system comprising a pair of shock absorbers pivoted together at one end to one unit of the vehicle in a position vertically above said universal joint and spaced apart on either side of the longitudinal centre line of the vehicle at their other end, the said system of shock absorbers permitting a controlled amount of pitch and roll of the units of the vehicle relative to each other about said universal joint, and the said steering system for said vehicle flexibly bridging the gap between the units of the vehicle and being located on either side of and approximately in the same horizontal plane of said universal joint, the said steering system including a double ended tapered grooved drum and a pair of cables secured thereto, the said cables having a differential action in take-up and pay-out of the cables on said drum commensurate with the cramping action between the units of the vehicle on angular displacement of one unit with respect to the other.

3. An articulated vehicle comprising two or more units joined together by a universal joint and a steering system including a system of shock absorbers, said shock absorbers being pivoted to adjacent ends of the vehicle units, the said shock absorber system comprising a pair of shock absorbers pivoted together at one end to one unit of the vehicle in a position vertically above said universal joint and spaced apart on either side of the longitudinal centre line of the vehicle at their other end, the said system of shock absorbers permitting a controlled amount of pitch and roll of the units of the vehicle relative to each other about said universal joint, and the said steering system for said vehicle flexibly bridging the gap between the units of the vehicle and being located on either side of and approximately in the same horizontal plane of said universal joint, the said steering system including a double ended tapered grooved drum and a pair of cables, the said cables being secured at one end to opposite ends of said tapered drum and at their other end to spring pots anchored to one of the units of the vehicle, the said cables having a differential action in take-up and pay-out of the cables on said double tapered drum commensurate with the cramping action between the units of the vehicle on angular displacement of one unit with respect to the other.

4. In an articulated vehicle as set forth in claim 1, in which each shock absorber is of the cylinder and piston type in which the cylinder is pivoted to one unit of the vehicle and the piston is pivoted to the other unit of the vehicle and in which a small volume of fluid is trapped between the cylinder and piston at the end of the stroke of the piston in either direction, the trapped volume of fluid providing an elastic cushion stop limiting the pitch and roll of one unit of the vehicle relative to the other.

5. In an articulated vehicle as set forth in claim 4, in which the piston of each shock absorber has controlled passages controlling the flow of fluid from one side of the piston to the other on change of direction of travel of the piston.

6. In an articulated vehicle as set forth in claim 5, in which one-way check valves within the passages in the piston control the flow of fluid from one side of the piston to the other.

7. In an articulated vehicle as set forth in claim 6, in which the piston has a hollow axial cylinder with which the controlled passage from each side of the piston communicates, and in which a needle valve seals the trapped fluid for a short distance of travel of the piston at the beginning of its stroke in either direction.

8. In an articulated vehicle as set forth in claim 7, in which the needle valve has a cylindrical section at each end forming a pair of pistons within the piston cylinder and is tapered down to a smaller diameter midway of its length between its cylindrical ends.

9. In an articulated vehicle as set forth in claim 8, in which the tapered needle valve is held stationary and permits an unrestricted flow of fluid from one side of the piston to the other when the piston is at mid stroke and a gradually restricted flow of fluid from one side of the piston to the other as the piston approaches the end of its stroke in either direction.

10. In an articulated vehicle as set forth in claim 3, in which the adjacent ends of the vehicle units are tapered back from their universal joint connection and the steering mechanism cables bridge the tapered gaps on each side of the universal joint to effect angular displacement of one unit with respect to the other.

11. In an articulated vehicle as set forth in claim 10, in which the steering cables are led over guide pulleys from the tapered drum in one unit of the vehicle over guide pulleys in the adjacent unit of the vehicle and back to and anchored to the first mentioned unit of the vehicle.

12. In an articulated vehicle as set forth in claim 11, in which the cable anchors on the first mentioned unit of the vehicle comprise spring dash pots.

13. An articulated vehicle comprising two or more units joined together by a universal joint and a steering system including a system of shock absorbers, said shock absorbers being pivoted to adjacent ends of the vehicle units, said shock absorber system comprising a pair of shock absorbers pivoted together at one end to one unit of the vehicle in a position vertically above said universal joint and spaced apart on either side of the longitudinal centre line of the vehicle at their other end, the said system of shock absorbers permitting a controlled amount of pitch and roll of the units of the vehicle relative to each other about said universal joint, the said steering system for said vehicle flexibly bridging the gap between the units of the vehicle and being located on either side of and approximately in the same horizontal plane of said universal joint, the said steering system having a differential action in take-up and pay-out commensurate with the cramping action between the units of the vehicle on angular displacement of one unit with respect to the other unit of the vehicle, a drive mechanism, an articulated drive shaft connecting said drive mechanism with each of said vehicle units, the said articulated drive shaft having a pair of universal joints spaced longitudinally apart an equal distance from the universal joint joining the vehicle units together.

References Cited in the file of this patent

UNITED STATES PATENTS

| | | |
|---|---|---|
| 1,396,956 | Hawthorne | Nov. 15, 1921 |
| 1,877,126 | Greer | Sept. 13, 1932 |
| 2,439,518 | Kasboske | Apr. 13, 1948 |
| 2,453,941 | Smit | Nov. 16, 1948 |
| 2,679,404 | Thompson | May 25, 1954 |